(12) United States Patent
Liu et al.

(10) Patent No.: US 12,122,103 B2
(45) Date of Patent: Oct. 22, 2024

(54) HIGH-SPEED POLYMER-TO-METAL DIRECT JOINING SYSTEM AND METHOD

(71) Applicant: THE REGENTS OF THE UNIVERSITY OF MICHIGAN, Ann Arbor, MI (US)

(72) Inventors: Fengchao Liu, Ann Arbor, MI (US); Pingsha Dong, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 17/870,418

(22) Filed: Jul. 21, 2022

(65) Prior Publication Data
US 2023/0173768 A1    Jun. 8, 2023

Related U.S. Application Data

(63) Continuation of application No. 16/856,534, filed on Apr. 23, 2020, now Pat. No. 11,396,139.
(Continued)

(51) Int. Cl.
*B29C 65/00* (2006.01)
*B29C 65/14* (2006.01)
*B29C 65/44* (2006.01)

(52) U.S. Cl.
CPC ........ *B29C 66/742* (2013.01); *B29C 65/1429* (2013.01); *B29C 65/44* (2013.01);
(Continued)

(58) Field of Classification Search
CPC . B29C 66/742; B29C 66/30326; B29C 66/43; B29C 65/1429; B29C 65/44
See application file for complete search history.

(56) References Cited

U.S. PATENT DOCUMENTS 4,411,952 A * 10/1983 Sasaki .................. H05K 1/0346
428/458
4,732,312 A    3/1988 Kennedy et al.
(Continued)

FOREIGN PATENT DOCUMENTS

CN        101530947 A    9/2009
CN        103894724 A    7/2014
(Continued)

OTHER PUBLICATIONS

Ho. P.S. et al. "Chemical bonding and reaction at metal/polymer interface." Journal of Vacuum Science & Technology A, 1985, vol. 3, pp. 739-745.
(Continued)

*Primary Examiner* — Daniel McNally
(74) *Attorney, Agent, or Firm* — Harness, Dickey & Pierce, P.L.C.

(57) ABSTRACT

A method of directly joining a polymer to a metal along a joint interface through the formation of C—O-M chemical bonds, where M represents an element in the metal to be joined. The method includes heating the metal to a predetermined temperature above a glass transition temperature of the polymer and less than a flash ignition temperature of the polymer and less than a metal melting temperature of the metal; and applying force to the joint interface of the metal and the polymer to generate intimate atomic contact between the metal and the polymer to create C—O-M chemical bonds between the metal and the polymer.

13 Claims, 10 Drawing Sheets

Related U.S. Application Data

(60) Provisional application No. 62/851,151, filed on May 22, 2019.

(52) U.S. Cl.
CPC ...... *B29C 66/022* (2013.01); *B29C 66/30326* (2013.01); *B29C 66/43* (2013.01)

(56) References Cited

U.S. PATENT DOCUMENTS

| | | | |
|---|---|---|---|
| 5,262,123 A | 11/1993 | Thomas et al. | |
| 6,676,008 B1 | 1/2004 | Trapp et al. | |
| 7,096,705 B2 | 8/2006 | Segal | |
| 8,114,474 B1 | 2/2012 | Dudt et al. | |
| 8,397,974 B2 | 3/2013 | Schultz et al. | |
| 8,632,850 B2 | 1/2014 | Schultz et al. | |
| 8,636,194 B2 | 1/2014 | Schultz et al. | |
| 8,875,976 B2 | 11/2014 | Schultz et al. | |
| 8,893,954 B2 | 11/2014 | Schultz et al. | |
| 9,205,578 B2 | 12/2015 | Schultz et al. | |
| 9,266,191 B2 | 2/2016 | Kandasamy et al. | |
| 9,511,445 B2 | 12/2016 | Kandasamy | |
| 9,511,446 B2 | 12/2016 | Kandasamy et al. | |
| 9,527,230 B2 | 12/2016 | Takeuchi et al. | |
| 9,555,580 B1 | 1/2017 | Dykstra et al. | |
| 9,643,279 B2 | 5/2017 | Schultz et al. | |
| 9,862,054 B2 | 1/2018 | Kandasamy et al. | |
| 9,943,929 B2 | 4/2018 | Schultz et al. | |
| 10,105,790 B2 | 10/2018 | Kandasamy | |
| 10,189,063 B2 | 1/2019 | Lavender et al. | |
| 10,500,674 B2 | 12/2019 | Kandasamy et al. | |
| 10,583,631 B2 | 3/2020 | Kandasamy et al. | |
| 11,311,959 B2 | 4/2022 | Hardwick et al. | |
| 2001/0011177 A1 | 8/2001 | Peterson | |
| 2002/0158109 A1 | 10/2002 | Gendoh et al. | |
| 2002/0190100 A1 | 12/2002 | Duncan, Jr. | |
| 2003/0192939 A1 | 10/2003 | Mishra | |
| 2004/0057782 A1 | 3/2004 | Okamoto et al. | |
| 2005/0081594 A1 | 4/2005 | Segal | |
| 2005/0121497 A1 | 6/2005 | Fuller et al. | |
| 2007/0040006 A1 | 2/2007 | Charles R. et al. | |
| 2008/0029581 A1 | 2/2008 | Kumagai et al. | |
| 2008/0041921 A1 | 2/2008 | Creehan et al. | |
| 2008/0236720 A1* | 10/2008 | Sigler | B29C 65/76 156/73.5 |
| 2009/0140027 A1 | 6/2009 | Badarinarayan et al. | |
| 2011/0104515 A1 | 5/2011 | Kou et al. | |
| 2011/0309131 A1 | 12/2011 | Hovanski et al. | |
| 2012/0279441 A1 | 11/2012 | Creehan et al. | |
| 2014/0064830 A1 | 3/2014 | Nagano et al. | |
| 2014/0367452 A1 | 12/2014 | Dinda et al. | |
| 2015/0075242 A1 | 3/2015 | Eller et al. | |
| 2016/0175981 A1 | 6/2016 | Kandasamy | |
| 2016/0361868 A1 | 12/2016 | Wang | |
| 2017/0008121 A1 | 1/2017 | Li | |
| 2017/0043429 A1 | 2/2017 | Kandasamy | |
| 2017/0151766 A1 | 6/2017 | Wang et al. | |
| 2018/0022038 A1 | 1/2018 | Zhang et al. | |
| 2018/0050418 A1 | 2/2018 | Dong et al. | |
| 2018/0050419 A1 | 2/2018 | Das et al. | |
| 2018/0073532 A1 | 3/2018 | Whalen et al. | |
| 2018/0178455 A1 | 6/2018 | Washika et al. | |
| 2018/0311713 A1 | 11/2018 | Joshi et al. | |
| 2019/0054672 A1 | 2/2019 | Kajihara et al. | |
| 2019/0134864 A1* | 5/2019 | Park | B29C 45/14795 |
| 2019/0283173 A1 | 9/2019 | Grong et al. | |
| 2019/0375148 A1 | 12/2019 | Susnjara et al. | |
| 2020/0016687 A1 | 1/2020 | Whalen et al. | |
| 2020/0262173 A1 | 8/2020 | Jung et al. | |
| 2020/0306869 A1 | 10/2020 | Hardwick et al. | |
| 2020/0306874 A1 | 10/2020 | Tsuta et al. | |
| 2020/0306876 A1 | 10/2020 | Tsuta et al. | |
| 2021/0078258 A1 | 3/2021 | Lalande et al. | |
| 2021/0197457 A1 | 7/2021 | Broach et al. | |
| 2021/0245293 A1 | 8/2021 | Hardwick et al. | |
| 2021/0308937 A1 | 10/2021 | Broach et al. | |
| 2021/0362380 A1 | 11/2021 | Liu et al. | |
| 2022/0080522 A1 | 3/2022 | Cox et al. | |
| 2022/0176633 A1 | 6/2022 | Hardwick et al. | |

FOREIGN PATENT DOCUMENTS

| | | |
|---|---|---|
| CN | 106132666 A | 11/2016 |
| CN | 106623936 A | 5/2017 |
| CN | 106794546 A | 5/2017 |
| CN | 106808095 A | 6/2017 |
| CN | 206520145 U | 9/2017 |
| CN | 108248058 A | 7/2018 |
| CN | 108367467 A | 8/2018 |
| CN | 110573290 A | 12/2019 |
| CN | 111745287 A | 10/2020 |
| CN | 111941962 A | 11/2020 |
| CN | 112123789 A | 12/2020 |
| EP | 1844890 A1 | 10/2007 |
| EP | 2777837 A1 | 9/2014 |
| JP | S63164450 A | 7/1988 |
| JP | H0289520 A | 3/1990 |
| JP | H07256482 A | 10/1995 |
| JP | 2000153374 A | 6/2000 |
| JP | 2001071155 A | 3/2001 |
| JP | 2003275876 A | 9/2003 |
| JP | 2009090359 A | 4/2009 |
| JP | 5353931 B2 | 11/2013 |
| JP | 6315017 B2 * | 4/2018 |
| KR | 101316989 B1 | 10/2013 |
| WO | 2012005722 A1 | 1/2012 |
| WO | 2016199100 A1 | 12/2016 |
| WO | 2017194793 A1 | 11/2017 |
| WO | 2019026331 A1 | 2/2019 |
| WO | 2019199100 A1 | 10/2019 |

OTHER PUBLICATIONS

International Search Report and Written Opinion mailed Aug. 11, 2020 in International Application No. PCT/US2020/029880.

Hussein et al. On Amorphous Phase Formation in Dissimilar Friction Stir Welding of Aluminum to Steel, Journal of Engineering and Applied Sciences, Apr. 2017, vol. 12, No. 7, pp. 69-81.

International Search Report and Written Opinion mailed Apr. 2, 2021 in PCT Application No. PCT/US2020/066613.

Liu et al. "Alloy amorphization through nanoscale shear localization at Al—Fe interface", Materials Today Physics vol. 15, Dec. 2020, (Year: 2020).

Liu et al., "From thick intermetallic to nanoscale amorphous phase at Al—Fe joint interface: roles of friction stir welding conditions", Scripta Materialia, vol. 191, Jan. 15, 2021, pp. 167-172 (Year: 2021).

International Search Report and Written Opinion of International Application No. PCT/US2020/042847 on Oct. 30, 2020.

Forging. (1992). In C. G. Morris (Ed.), Academic Press Dictionary of Science and Technology (4th ed.). Elsevier Science & Technology. Credo Reference: https://search .credoreference.com/content/entry/apdst/forging/0?InstitutionId=7 43 (Year: 1992).

Forging. (2008). In Philip's encyclopedia. Philip's. Credo Reference: https://search.credoreference.com/content/entry/philipency/forging/0?institutionId=743 (Year: 2008).

Francesco Lambiase et al. "Friction assisted joining of aluminum and PVC." Journal of Manufacturing Processes 29 (2017) 221-231.

F.C. Liu et al. "On formation of Al—O—C bonds at aluminum/polyamide joint interface." Applied surface Science 466 (2019( 202-209).

F.C. Liu et al. "A high-speed metal-to-polymer direct joining technique and underlying bonding mechanisms." Journal of Materials Processing Tech. 280 (2020) 116610.

S.C. Han et al. "Achieving a strong polypropylene/aluminum alloy friction spot joint via a surface laser processing pretreatment." Materials Science & Technology (2020).

International Search Report and Written Opinion regarding International Application No. PCT/US2021/033070, dated Sep. 9, 2021.

(56) References Cited

OTHER PUBLICATIONS

Ogura et al., "Partitioning evaluation of mechanical properties and the interfacial microstructure in a friction stir welded aluminum alloy/stainless steel lap joint", Scripta Materialia, vol. 66, Issue 8, 2012, pp. 531-534, (Year: 2012).

Tanaka et al. "Dissimilar joining of aluminum alloy and steel sheets by friction stir spot welding*", Journal of Japan Institute of Light Metals, vol. 56, No. 6 (2006), pp. 317-322 (Year: 2006).

IU Fengchao et al.: "3D printing of find-grained aluminum alloys through extrusion-based additive manufacturing: Microstructure and property characterization", Journal of Materials Science & Technology, Allertion Press, Amsterdam, NL, vol. 139, Sep. 24, 2022 (Sep. 24, 2022), pp. 126-136.

Tuncer Nihan et al.: "Solid-State Metal Additive Manufacturing: A Review", JOM: Journal of Metals, Springer New York LLC, United States, vol. 72, No. 9, Jul. 9, 2020 (Jul. 9, 2020), pp. 3090-3111.

Extended European Search Report regarding Patent Application No. 20854637.4, dated Aug. 18, 2023.

Extended European Search Report regarding Patent Application No. 20808972.2, dated Jul. 13, 2023.

Kondoh Katsuyoshi et al: "CO bond enhancing direct bonding strength between plastic and pure titanium", Materials Letters, vol. 211, Oct. 16, 2017 (Oct. 16, 2017), pp. 331-334, XP085274161, ISSN: 0167-577X, DOI: 10.1016/J.MATLET.2017.10.042.

Chinese Office Action regarding Patent Application No. 202080091956.0, dated Mar. 29, 2024.

International Search Report and Written Opinion of the ISA, issued in PCT/US2023/028221, mailed Nov. 15, 2023; ISA/US (10 pages).

Chen et al., "Effects of initial oxide on microstructural and mechanical properties of friction stir welded AA2219 alloy", Materials & Design vol. 86, Dec. 5, 2015, pp. 49-54, https://doi.org/10.1016/j.matdes.2015.06.179 (Year: 2015).

Chinese Office Action regarding Patent Application No. 202080049281.3, dated Apr. 17, 2024.

Extended European Search Report regarding Patent Application No. 21809658.4, dated May 22, 2024.

O.P. Korobeinichev: "Kinetics of thermal decomposition of PMMA at different heating rates and in a wide temperature ränge", Thermochimica Acta, vol. 671, 2019,, Oct. 30, 2018 (Oct. 30, 2018), pp. 17-25, XP093161256, DOI: https://doi.org/10.1016/j.tca.2018.10.019 Retrieved from the Internet: URL:https://www.sciencedirect.com/science/article/pii/S0040603118303460#sec0055, abstract; figure 14.

* cited by examiner

HIGH-SPEED POLYMER-TO-METAL DIRECT JOINING SYSTEM AND METHOD

CROSS-REFERENCE TO RELATED APPLICATIONS

This application is a continuation of U.S. patent application Ser. No. 16/856,534 filed on Apr. 23, 2020, which claims the benefit of U.S. Provisional Application No. 62/851,151 filed on May 22, 2019. The entire disclosures of the above applications are incorporated herein by reference.

FIELD

The present disclosure relates to the joining of a polymer and a metal and, more particularly, relates to a high-speed polymer-to-metal direct joining system and method.

BACKGROUND AND SUMMARY

This section provides background information related to the present disclosure which is not necessarily prior art. This section provides a general summary of the disclosure, and is not a comprehensive disclosure of tis full scope or all of its features.

Engineering plastic and polymer composites, such as fiber reinforced polymers (FRP), are increasingly used for minimizing weight in airframes, auto-bodies, and marine structures in combination with structural metals. Traditional fastening methods, such as mechanical fastening and adhesive bonding, have significant limitations when joining dissimilar materials. For example, mechanical fastening adds weight and process steps, and is difficult to achieve hermetic sealing in some applications. Similarly, adhesive bonding requires surface preparation and long curing time. Moreover, inadvertent disassembly may occur during operation or service, particularly as adhesives suffer thermal and environmental degradation.

To address these limitations, the present teachings provide a robust technique for directly joining polymeric material to metal through the formation of strong chemical bonds of "C—O-M" (where "M" represents an element in the metal to be jointed) at the interface. Previously, researchers have pursued to directly join metal and polymer through the formation of Van der Waals bonds and/or hydrogen chemical bonds at the polymer interface. A very recent scientific research of the inventors showed that chemical bonds "C—O-M" can be developed at the polymer metal interface instead. The "C—O-M" chemical bonds are more reliable and desirable than the hydrogen bonds or Van der Waals bonds at the interface. The unpublished results of the inventors showed that specific conditions (including surface conditions, interfacial pressure, temperature, and time) need to be created at the joint interface for developing enough "C—O-M" chemical bonds. These lead to the development of the present teachings as all the available joining solutions are not suitable for directly joining polymeric material to metal through the formation of strong chemical bonds of "C—O-M" in practical applications.

It should be understood that in order to develop a C—O-M bond, a polymer surface should contain sufficient carbonyl groups (C=O) because these C=O groups will transfer to C—O-M groups when it meets M atoms in the metal under welding condition. In order to make these reactions sufficient, in some embodiments, dirt and grease should be removed from metal surface to achieve intimate atomic contact between the polymer surface and the metal surface during welding.

As described herein, in embodiments wherein the polymer surface do not contains sufficient carbonyl groups, air pockets can be introduced at the joint interface to in-situ form carbonyl groups though the reaction of polymer surface and the air within the air pockets. The intermediate state of carbonyl groups (C=O) on polymer surface will transfer to C—O-M group.

The developed joining method according to the present teachings has unique advantages in terms of welding speed, process control, and joints quality compare to other conventional joining techniques.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
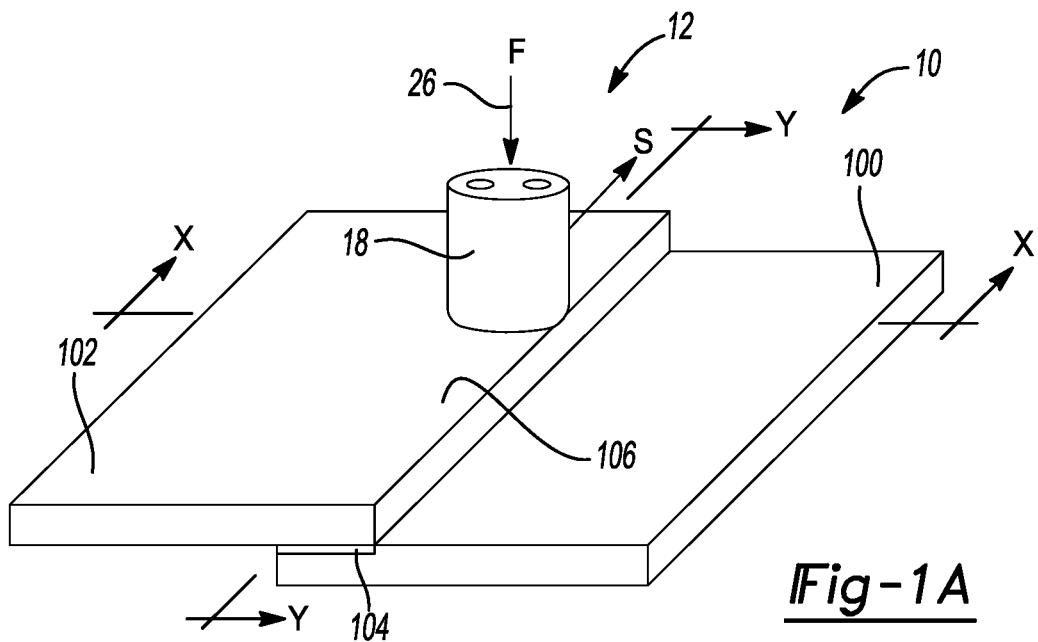
FIG. 1A is a schematic view of a joining system for directly joining polymer to metal along a joint interface according to the principles of the present invention.
Figure 1B:
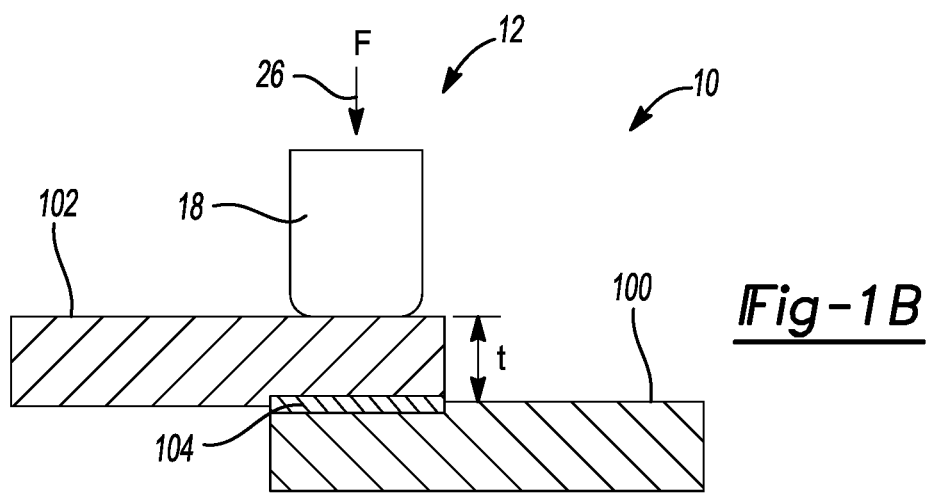
FIG. 1B is a side view of the joint interface of the polymer and metal according to the principles of the present invention taken along line X-X of FIG. 1A.
Figure 1C:
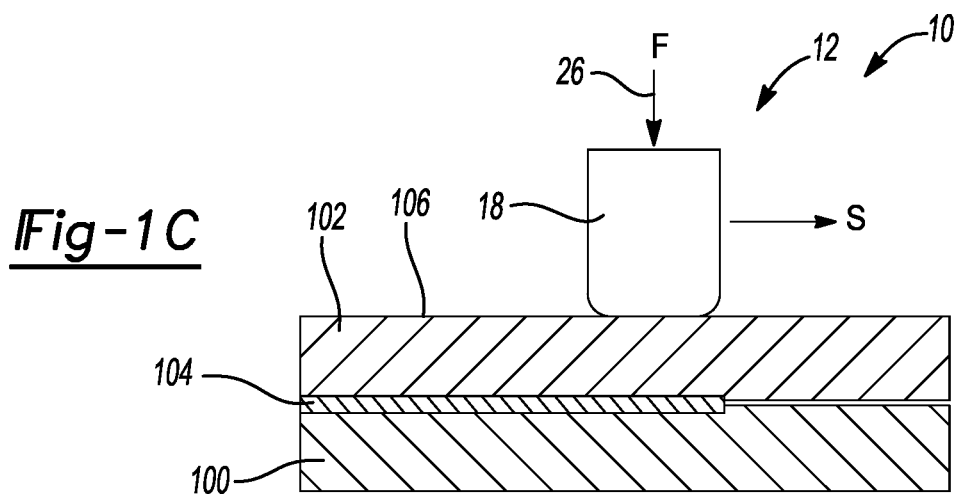
FIG. 1C is a side view of the joint interface of the polymer and metal according to the principles of the present invention taken along line Y-Y of FIG. 1A.
Figure 2:
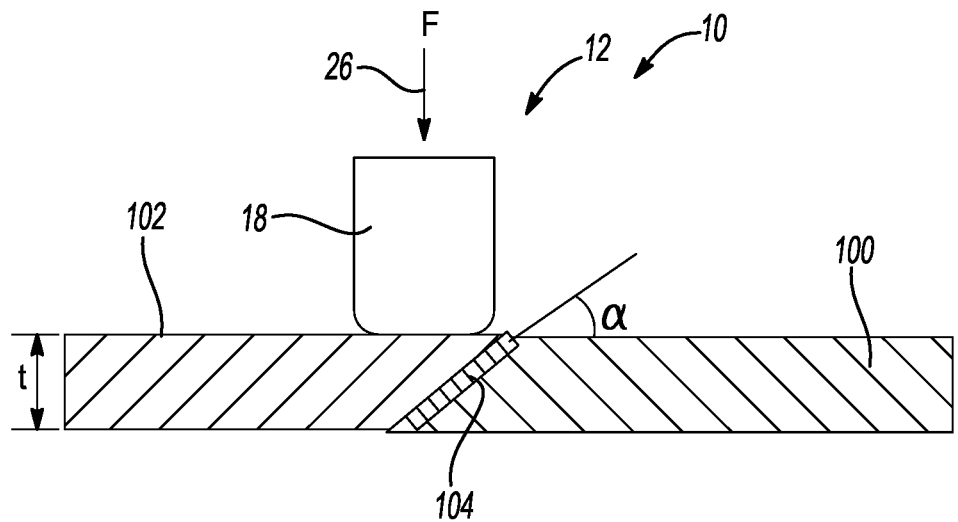
FIG. 2 is a side view of butt joint with an inclined/vertical joint interface of the polymer and metal according to the principles of the present invention.
Figure 3:
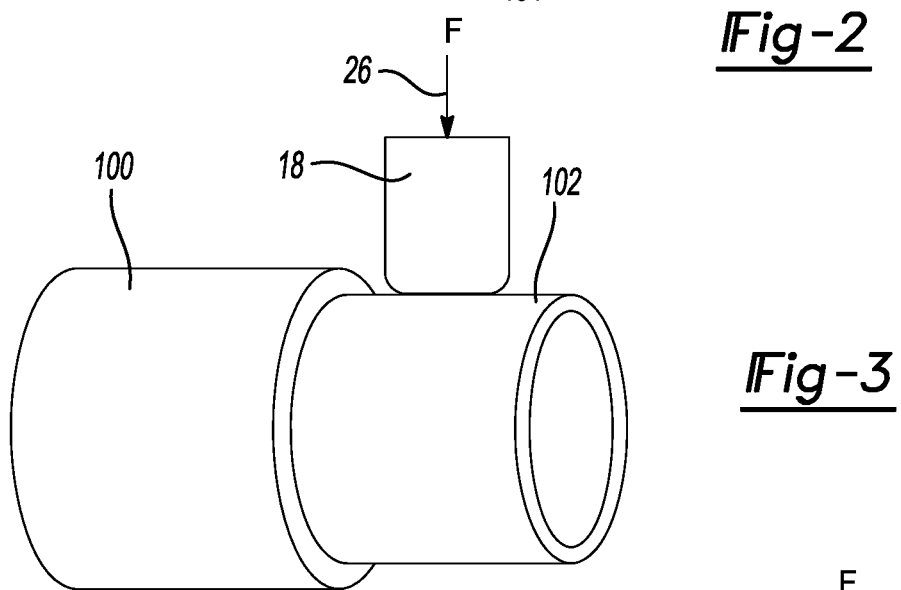
FIG. 3 is a schematic view of a joining view system for directly joining a polymer tube to a metal tube with smaller diameter along a joint interface according to the principles of the present invention. The required interfacial compression pressure is achieved by the combination of interference fit and thermal expansion or additional forging pressure applicator.
Figure 4:
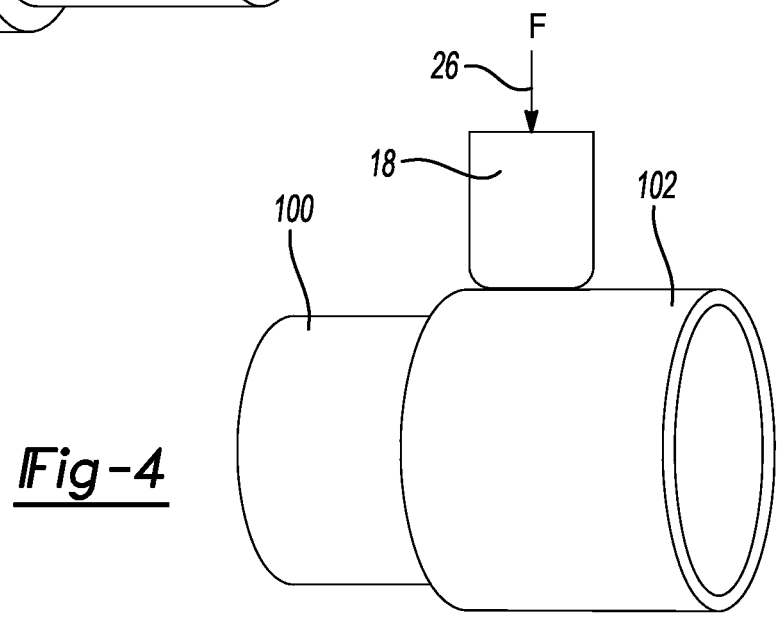
FIG. 4 is a schematic view of a joining system for directly joining polymer tube to metal tube with bigger diameter along a joint interface according to the principles of the present invention.
Figure 5:
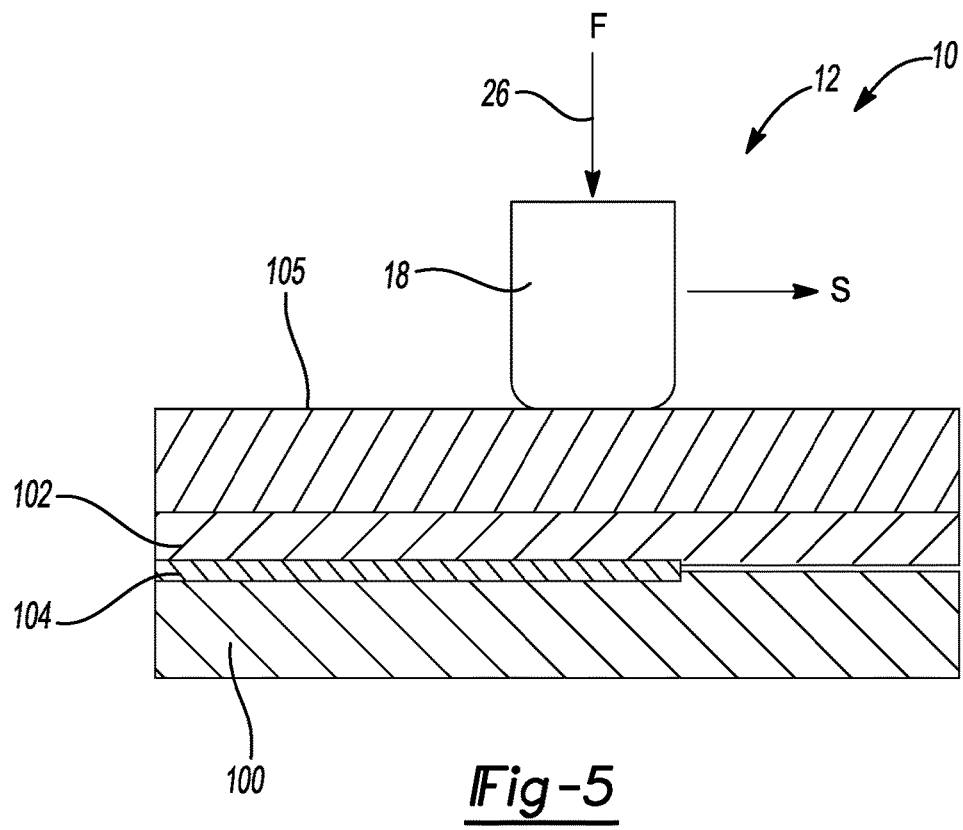
FIG. 5 is a side view of the joining system according to the principles of the present invention having a protective layer and a movable unitary pressure applicator heating tool.
Figure 6:
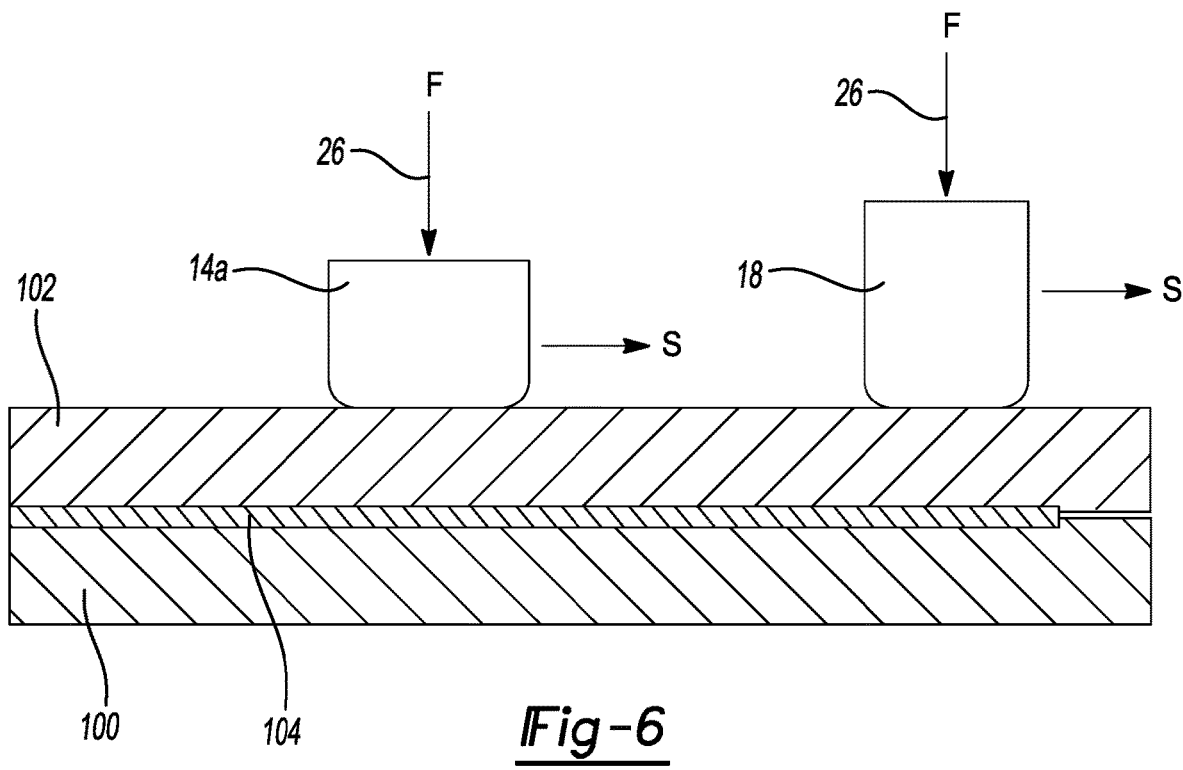
FIG. 6 is a side view of the joining system according to the principles of the present invention having a movable forging pressure applicator and a movable unitary pressure applicator heating tool.
Figure 7:
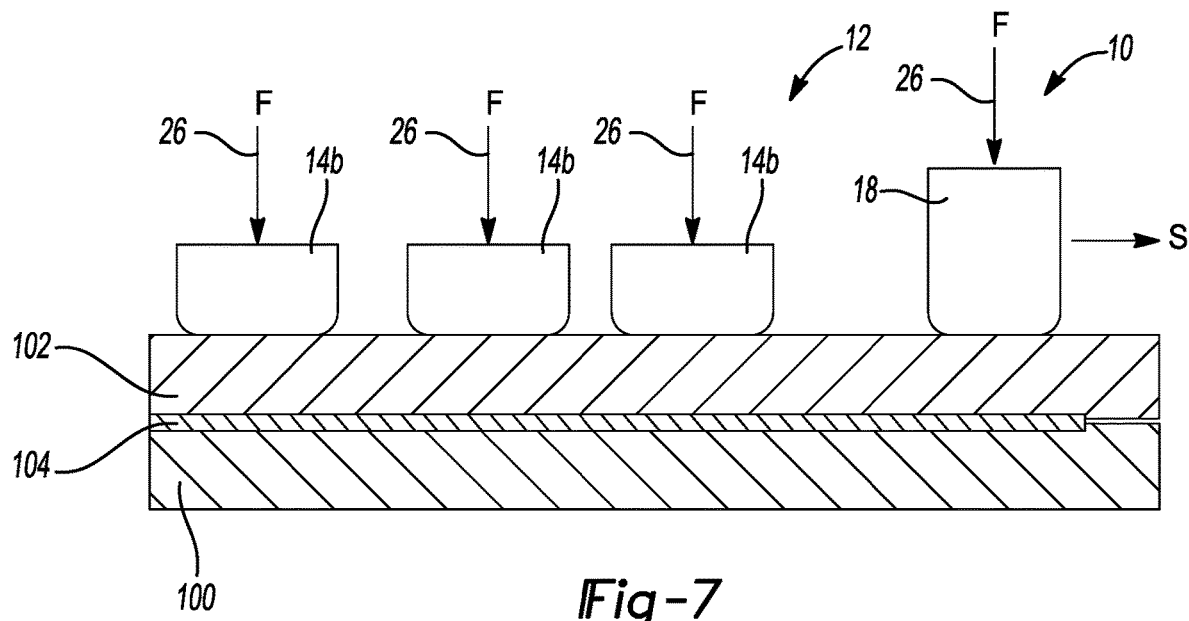
FIG. 7 is a side view of the joining system according to the principles of the present invention having a plurality of stationary forging pressure applicator and a movable unitary pressure applicator heating tool.
Figure 8:
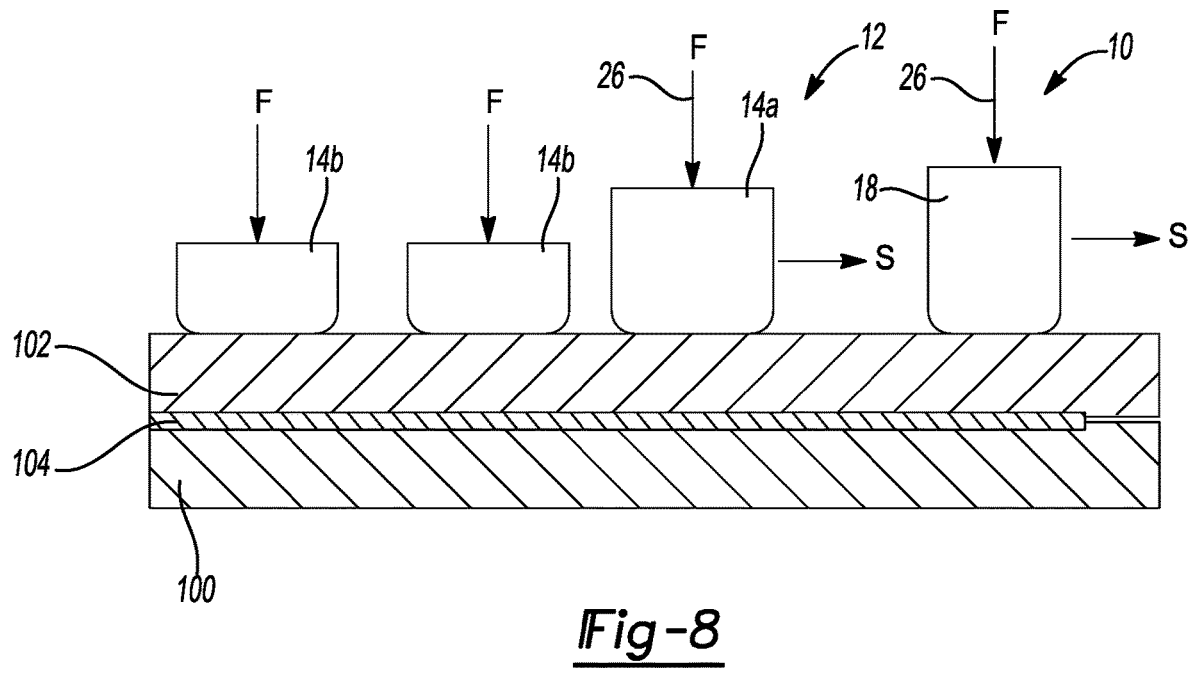
FIG. 8 is a side view of the joining system according to the principles of the present invention having a plurality of stationary forging pressure applicators, a movable forging pressure applicator, and a movable unitary pressure applicator heating tool.
Figure 9:
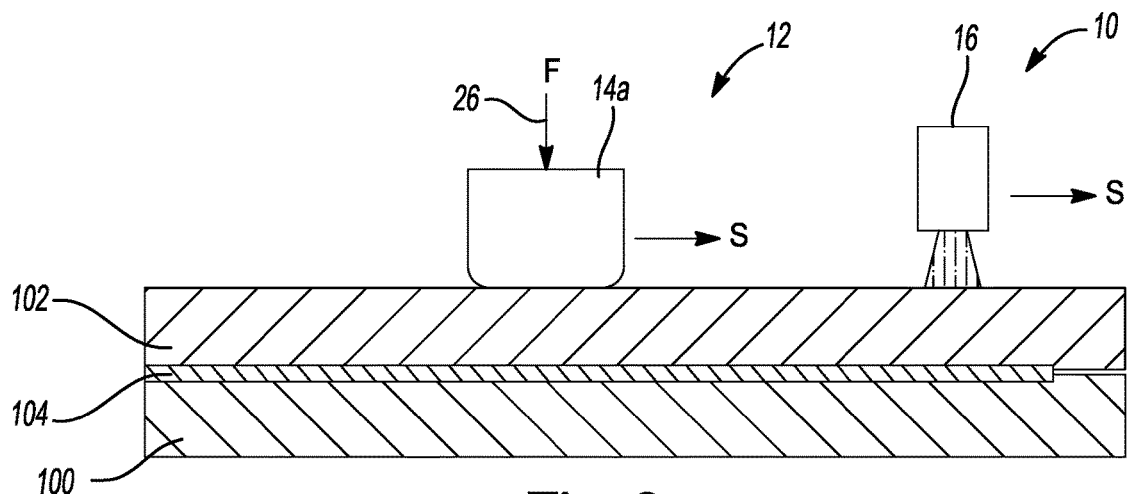
FIG. 9 is a side view of the joining system according to the principles of the present invention having a movable forging pressure applicator and a movable heating system.
Figure 10:
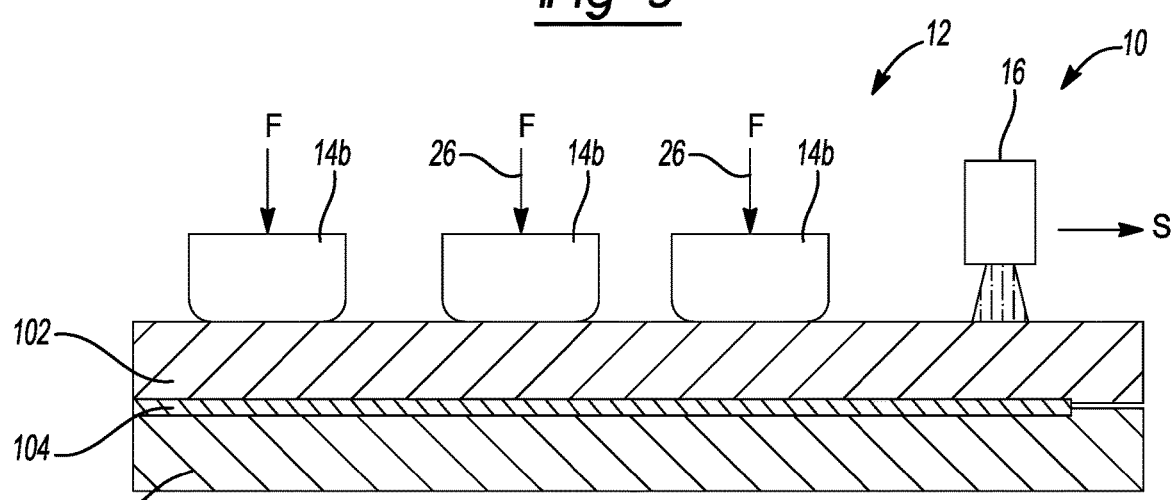
FIG. 10 is a side view of the joining system according to the principles of the present invention having a plurality of stationary forging pressure applicators and a movable heating system.
Figure 11:
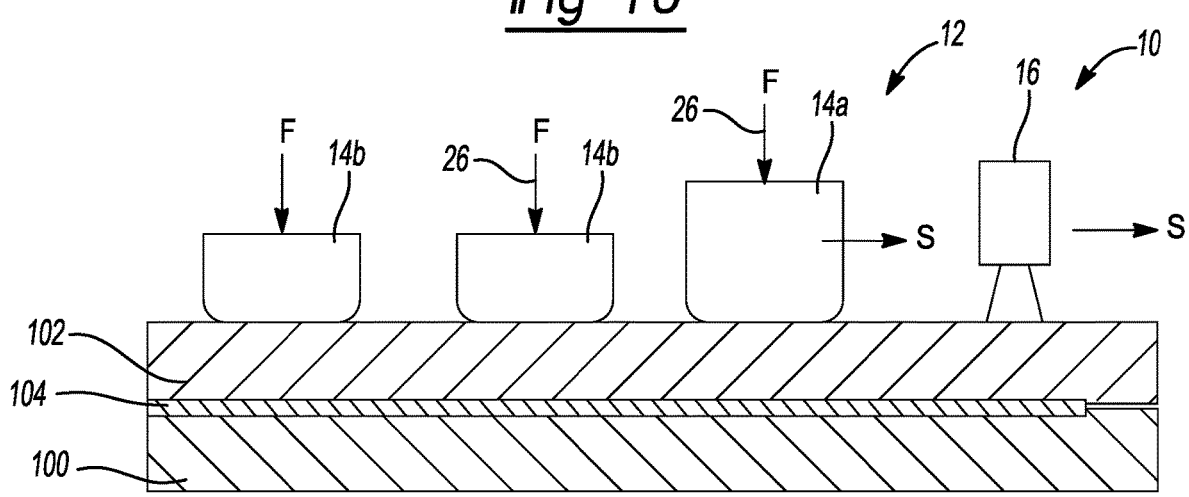
FIG. 11 is a side view of the joining system according to the principles of the present invention having a plurality of stationary forging pressure applicators, a movable forging pressure applicator, and a movable heating system.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, as illustrated in FIGS. 1A-21, a joining system 10 and associated method are provided for directly joining polymer 100 (e.g. thermoplastic component) to metal 102 along a joint interface 104 that is capable of a joining speed as high as 5 m/min by forming C—O-M chemical bonds at the joint interface 104. It should be appreciated that the present system and method can be achieved without the use or need for adhesive between the polymer 100 and the metal 102.

In some embodiments, polymer 100 can comprise any polymers suitable for forming quality polymer/metal joints, including but not limited to thermoplastics, polymer composites, or other polymers with thermoplastic surfaces. In some embodiments, polymer 100 can be generally planar, tubular, or other prefabricated shapes and have a thickness in the range of about 0.1 mm to 20 mm.

In some embodiments, metal 102 can comprise any metal suitable and sufficiently clean for forming quality polymer/metal joints, including but not limited to steels, alloys of titanium, aluminum, alloys of magnesium, copper, metal matrix composites, and the like. Moreover, metal 102 can have a thickness in the range of about 0.01 to 20 mm. In some embodiments, metal 102 can be generally planar, tubular, or other prefabricated shapes. In some embodiments, metal 102 can comprise distributed air pockets along a surface thereof (i.e. aligned with joint interface 104). In some embodiments, these distributed air pockets can be achieved by (1) adding a layer of porous structure (inducing metal mesh and metal fragments) between the metal and polymer or (2) producing in-situ distributed air pocket using an associated air pocket forming system (e.g. distributed 3D surface features, grooves, or protrusions) on the metal surface using an appropriate mechanical engraving, electron beam, chemical agent, and/or electrical discharge system. In some embodiments, the depth or height of the air pockets can be greater than 10 microns. In some embodiments, the depth or height of the air pockets can be greater than 50 microns.

Generally, in some embodiments, joining system 10 and the associated method employ a specially designed welding tool system 12 to apply a downward compression pressure and localized heating upon an overlapping region 106 of joint interface 104. The resultant joint interface 104 can be in form of spot, linear, or curvilinear form and can be along an interface surface generally perpendicular to (see FIGS. 1B, 1C, and 3-20) or inclined relative to (see FIGS. 2 and 21) the direction of the applied force, F. In some embodiments, as will be discussed herein, the welding tool system 12 can comprise at least one forging pressure applicator 14 (14a, 14b) and at least one heating system 16. As illustrated in FIGS. 1A-5, in some embodiments, the forging pressure applicator 14 and the heating system 16 can be integrated into a unitary pressure applicator heating tool 18. Accordingly, unitary pressure applicator heating tool 18 is thus configured to apply both a downward compression pressure and localized heating from a singular device. It should be understood that according to the principles of the present method, application of the downward compression pressure can be simultaneous or sequentially sequenced with application of localized heating. The welding temperature needs to be reduced to below the polymer melting temperature before 5% of the melted polymer has pyrolyzed by increasing the travel speed of the welding tool or removing the heating tool from the metal surface.

Conversely, with particular reference to FIGS. 6-11, in some embodiments, forging pressure applicator 14 and heating system 16 can be separate, distinct tools, systems, or members and be operated independently, as will be discussed herein. When forging pressure applicator 14 and heating system 16 are separate, heating system 16 can be positioned in a downstream position, that is in a position that is first, relative to a direction of travel, such that localized heat is applied to metal 102 and/or polymer 100 and then thereafter compression pressure is applied to metal 102 and/or polymer 100.

In some embodiments, heating system 16 and/or unitary pressure applicator heating tool 18 is configured to heat metal 102 and consequently polymer 100 at overlapping region 106 to a predetermined temperature. In some embodiments, heating system 16 and/or unitary pressure applicator heating tool 18 can comprise a thermal heating system, an induction heating system, a friction system (e.g. (1) a bar tool frictionally engaging metal 102 to heat metal 102 via the relative rubbing of the bar against metal 102; (2) a bar tool frictionally engaging protective metal layer 105 adjacent to metal 102 to heat protective metal layer 105 via the relative rubbing of the bar against metal 102), a high-rate plastic deformation system, an electric resistance system, a high-energy beam system (e.g. energy beam gun), and the like to provide sufficient thermal energy to heat metal 102 to a temperature at or above the glass transition temperature (Tg) of polymer 100 and lower than the polymer flash ignition temperature of polymer 100 or metal melting temperature of metal 102, whichever is lower. In some embodiments, the welding speed should be higher than 2 m/min to reduce the high temperature duration time to avoid extensive polymer decomposition at the joint interface.

In some embodiments, forging pressure applicator 14 (including 14a and 14b) and/or unitary pressure applicator heating tool 18 is coupled to a pressure application system 26 for applying a predetermined downward compression pressure to forging pressure applicator 14 (including 14a and 14b) and/or unitary pressure applicator heating tool 18 that is transferred to metal 102 and polymer 100. The predetermined downward compression pressure must be high enough to generate intimate atomic contact at joint interface 104 between metal 102 and polymer 100 (e.g., at or above flow stress of softened polymer at joint interface during wielding and lower than the yield strength of polymer matrix 100). In other words, during welding, a layer of polymer at the joint interface is softened at elevated temperatures. The applied compression pressure should be higher than the flow stress of the softened polymer layer.

Accordingly, it should be understood that unitary pressure applicator heating tool 18, singularly, or forging pressure applicator 14 in combination with heating system 16 provide heating of metal 102 at contact location 106 up to a desired temperature while simultaneously or nearly simultaneously pressing against metal 102 placed above the polymer 100 resulting in intimate atomic contact between metal 102 and polymer 100 and resulting in strong chemical bonding of metal 102 and polymer 100 at joint interface 104. A 'strong chemical bond' is understood in the art to be formed from the transfer or sharing of electrons between atomic centers and relies on the electrostatic attraction between the protons in nuclei and the electrons in the orbitals.

As specifically illustrated in FIGS. 3-8, in some embodiments, a plurality of forging pressure applicators 14 can be used to apply sequential and/or prolonged compression pressure. That is, in some embodiments as illustrated in FIGS. 3, 5, 6, and 8, forging pressure applicators 14, specifically denoted at 14a, can be configured to be movable relative to metal 102 and polymer 100 in a moving direction, S. In this way, forging pressure applicator 14a can be moved together with unitary pressure applicator heating tool 18 and/or heating system 16 while remaining in contact with metal 102. Thus, forging pressure applicator 14a can apply a compression pressure upon metal 102 and polymer 100 after application of heat from heating system 16 or unitary pressure applicator heating tool 18. Moving of the components of the present teachings can be achieved using any conventional drive system operable to achieve the desired rate of movement.

Likewise, in some embodiments as illustrated in FIGS. 7, 8, 10, and 11, forging pressure applicators 14, specifically denoted at 14*b*, can be configured to be stationary relative to metal 102 and polymer 100. In this way, forging pressure applicator 14*b* can be positioned in a singular location in contact with metal 102. Thus, forging pressure applicator 14*b* can apply a compression pressure upon metal 102 and polymer 100 at a localized location after application of heat from heating system 16 or unitary pressure applicator heating tool 18.

It should be understood, as illustrated in FIGS. 7, 8, 10, and 11, in some embodiments, a plurality of movable forging pressure applicators 14*a* and/or a plurality of stationary forging pressure applicators 14*b* can be used to provide extended application of downward compression pressure upon metal 102 and polymer 100 during initiation and development of the strong chemical bond between metal 102 and polymer 100. Moreover, by using one or more stationary forging pressure applicators 14*b*, compression pressure can be applied at the overlapping region 106 and/or joint interface 104 during cooling to ensure proper formation of the strong chemical bond at joint interface 104.

Figure 12:
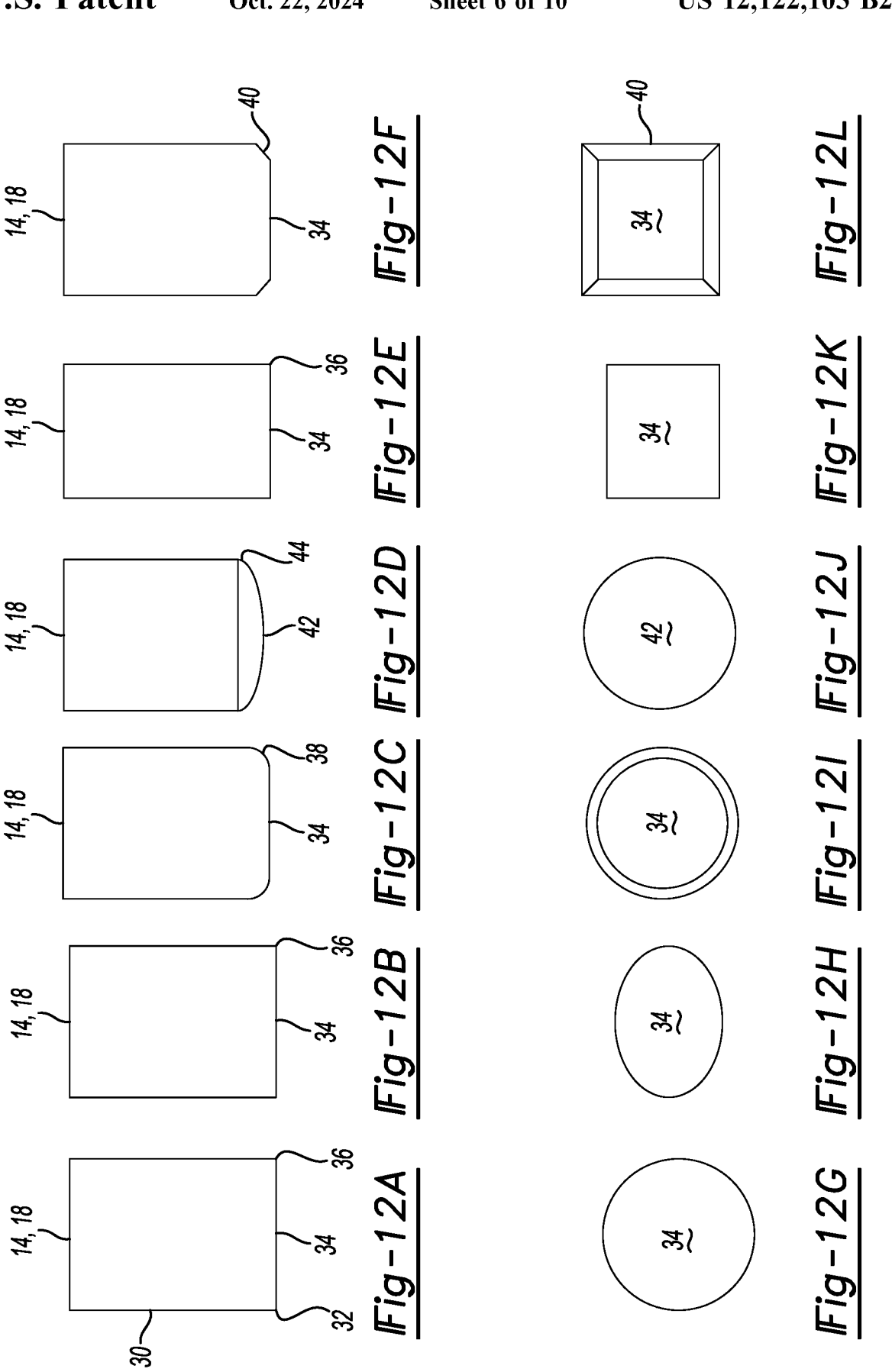
FIGS. 12A-12L is a series of side and bottom views of a plurality of forging pressure applicators and/or unitary pressure applicator heating tools according to the principles of the present invention.

In some embodiments, as illustrated in FIGS. 1-12L, forging pressure applicator 14 and/or unitary pressure applicator heating tool 18 can comprise a generally elongated configuration. Accordingly, in the interest of brevity, the shapes thereof will be discussed together. However, it should be understood that the present discussion is applicable to the shape of both forging pressure applicator 14 (including 14*a* and 14*b*) and/or unitary pressure applicator heating tool 18. Therefore, in some embodiments as particularly illustrated in FIGS. 12A-12L, the elongated configuration can comprise a body portion 30 having a distal end 32. In some embodiments, distal end 32 of body portion 30 can be shaped to define a pressure application surface 34 having a predetermined shape. In some embodiments, as illustrated in FIGS. 12A-12F and 12I-12L, distal end 32 can have a generally flat application surface 34. In some embodiments, as illustrated in FIGS. 12A, 12C, 12I, generally flat application surface 34 can comprise generally straight, defined outer edges 36. On the other hand, in some embodiments, generally flat application surface 34 can terminate at a rounded edge portion 38 (see FIGS. 12E-12F) or an inclined edge portion 40 (see FIGS. 12K-12L). In some embodiments, as illustrated in FIGS. 12G-12H, distal end 32 can have a generally curved application surface 42 that can terminate at a defined outer edge (not shown) or a rounded edge portion 44. With particular reference to FIGS. 12B, 12D, 12F, 12H, 12J, and 12L, it should be appreciated that body portion 30 can define any desired cross-sectional shape desirable for applying heat and/or compression pressure upon metal 102 and/or polymer 100, including but not limited to cylindrical, rectangular, square, oval, oblong, ellipsoidal, and the like. In some embodiments, the cross-sectional area of application surface 34, 42 can be less than a cross-sectional area of body portion 30.

Figure 13:
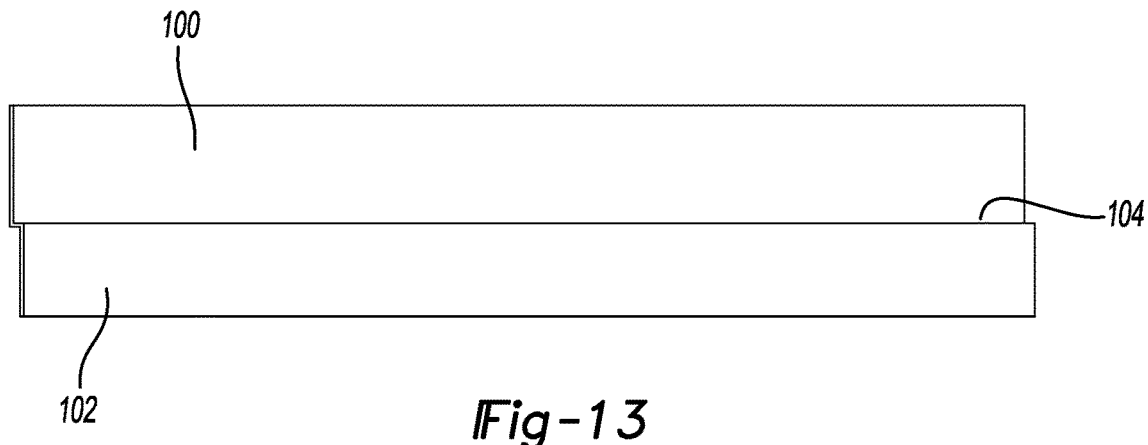
FIG. 13 is a photograph illustrating a joint interface of metal and polymer created in accordance with the principles of the present invention.
Figure 14:
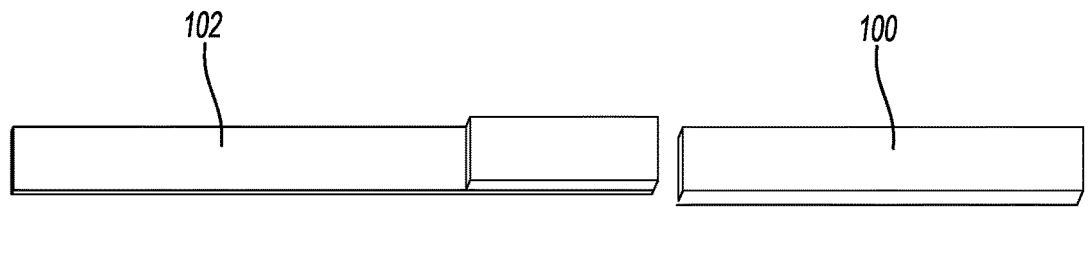
FIG. 14 is a photograph illustrating a rupture tensile test sample evidencing failure of the test samples at a location other than the joint interface of metal and polymer.
Figure 22:
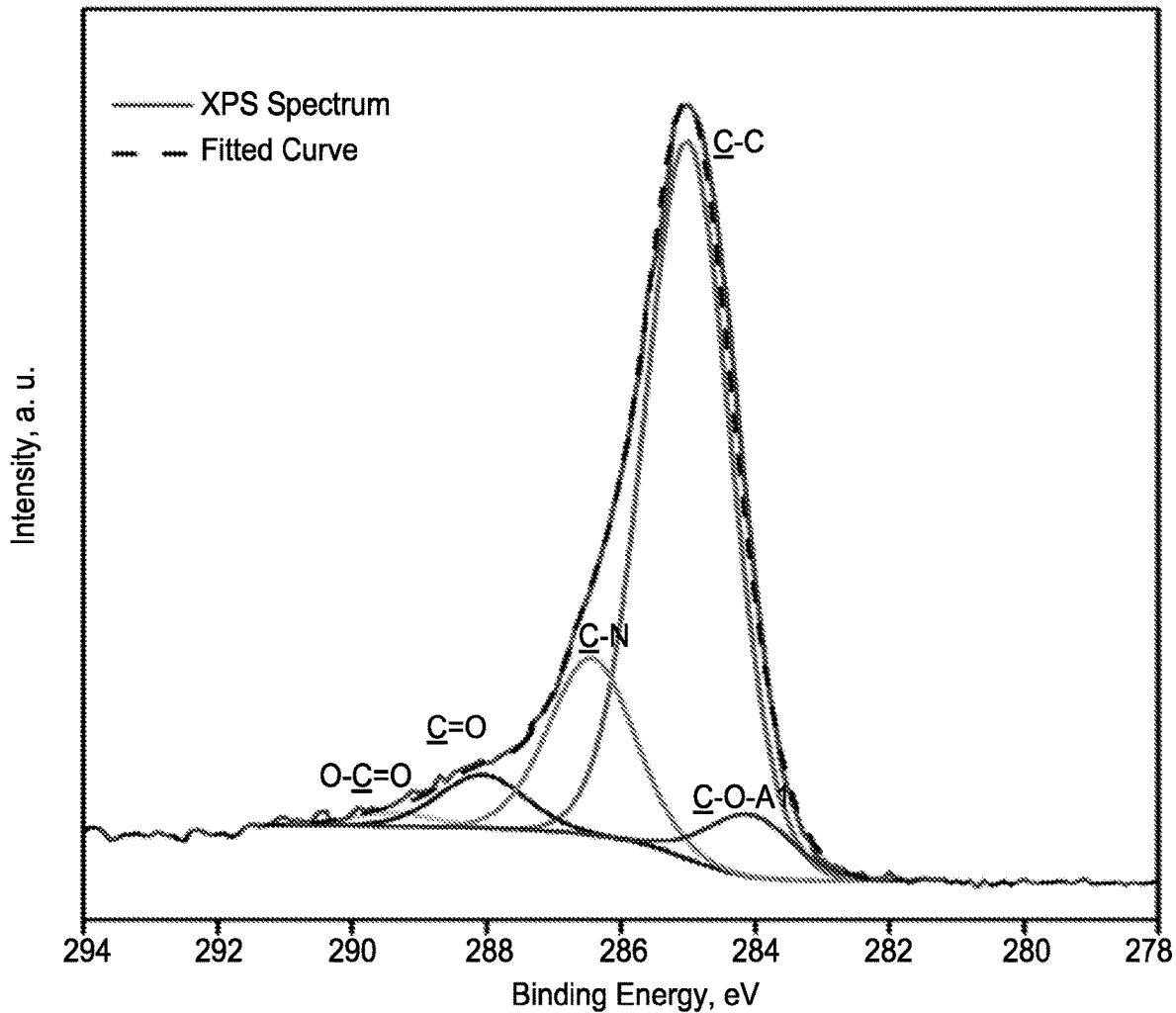
FIG. 22 is a graph illustrating X-ray photoelectron spectroscopy result showing C—O—Al chemical bonds developed at the joint interface in accordance with the principles of the present invention for nylon and an Al alloy.

During operation, welding tool system 12 is maintained vertical or near vertical with respect to the surface of metal 102 during joining. The strong chemical bond (C—O-M) formed at joint interface 104 has been shown as a major contributor to good joint strengths observed. As illustrated in FIG. 13, joint interface 104 is created between metal 102 and polymer 100. As evidenced by the rupture tensile test sample illustrated in FIG. 14, failure of the test samples at a location other than joint interface 104 confirms the robustness of the present strong chemical bond created in accordance with the present teachings. Finally, as illustrated in the graph of FIG. 22, X-ray photoelectron spectroscopy result confirm C—O—Al chemical bonds developed at the joint interface 104 in accordance with the principles of the present invention for nylon and an Al alloy.

In some embodiments, a protective layer 105 is necessary for protecting metal component 102 or welding tools when the metal plate 102 is too thin, too soft, or too hard. In some embodiments, the protective layer 105 can be light alloy plate with thickness of 0.5-2 mm. In some embodiments, the heating can be generated by the friction between the welding tool and the protective layer 105.

According to the principles of the present teachings, several advantages and improvements are realized over existing conventional methods. For example, but not limited to, the present teachings provide an easier to operate mechanism and method with fewer parameters to control, a higher joining speed, that is suitable for automation and robotic applications, has consistent joint quality and high joining strengths, that does not require special surface treatment for many polymer/metal combinations (e.g. the polymer surface contains enough carbonyl groups (C=O)), and requires only minimum energy consumption and is environmental-friendly. However, in some embodiments, such as for some polymer/metal combinations (e.g. the polymer surface does have enough carbonyl groups), additional surface treatment (such as surface texturing, carbonyl group grafting techniques) can further improve joint performance under some service conditions by promoting C—O-M bonds.

In particular, in some embodiments, distributed air pockets can be introduced at the interface between the metal and polymer to be joined. In some embodiments, these distributed air pockets can be achieved by (1) adding a layer of porous structure 108 (inducing metal mesh and metal fragments) between the metal and polymer or (2) producing in-situ distributed air pocket (e.g. distributed 3D surface features, grooves, or protrusions) on the metal surface 100 using mechanical engraving, electron beam, chemical agent, or electrical discharge. In some embodiments, specific temperature and pressure environments can be applied to enable the reaction between polymer and the air. The joining temperature at the interface need to be above the glass transition temperature (Tg) of polymer 100 and lower than the polymer flash ignition temperature of polymer 100 or metal melting temperature of metal 102, or melting temperature of distributed air pocket structure, whichever is lower. The pressure at the interface need to be high enough to generate enough flow of softened polymer materials. In other words, during welding, a layer of polymer at the joint interface is softened at elevated temperatures. In some embodiments, the welding speed should be higher than 2 m/min to reduce the high temperature duration time to avoid extensive polymer decomposition at the interface. The applied compression pressure should be higher than the flow stress of the softened polymer layer and enable the flow of the softened polymer into the distributed air pocket structure. The welding temperature need to be reduced below the polymer melting temperature before 5% of the melted polymer has pyrolyzed.

In some embodiments, the depth or height of the air pockets can be greater than 10 microns to trap enough air In some embodiments, a layer of porous structure 108 is inserted into the interface between metal 102 and polymer 100 prior to the joining.

In some embodiments, a layer of porous structure 108 is joined to metal 100 first, and then is placed in between metal 102 and polymer 100 prior to the joining.

Figure 15:
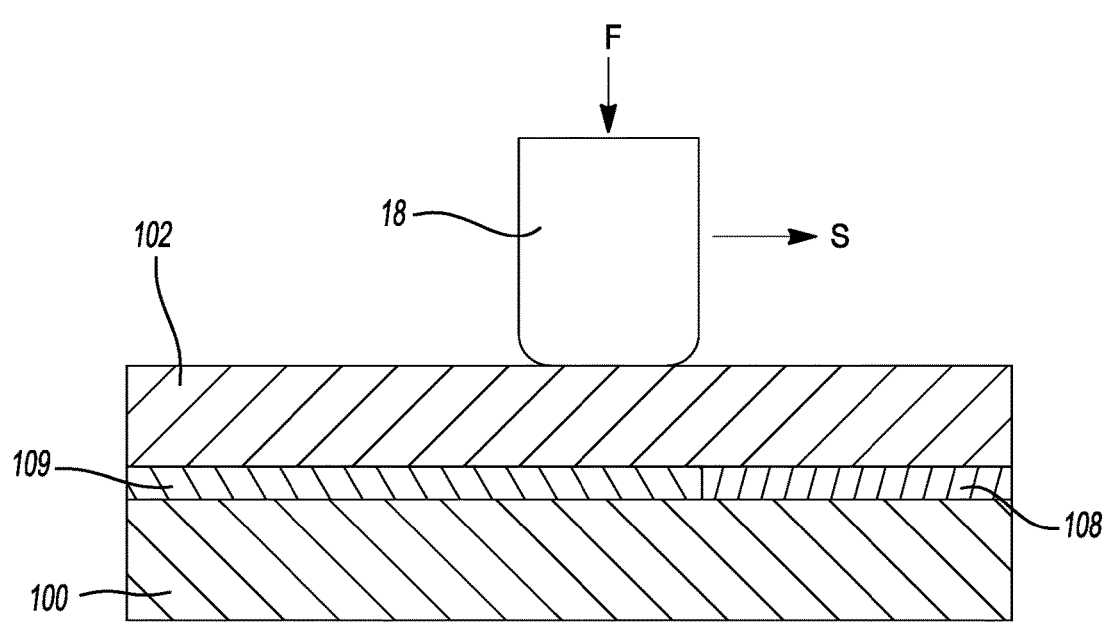
FIG. 15 is a side view of the joining system according to the principles of the present invention having a layer of porous structure (108) between the metal and polymer for producing a 3D "C—O-M" chemical bonds (109).
Figure 16:
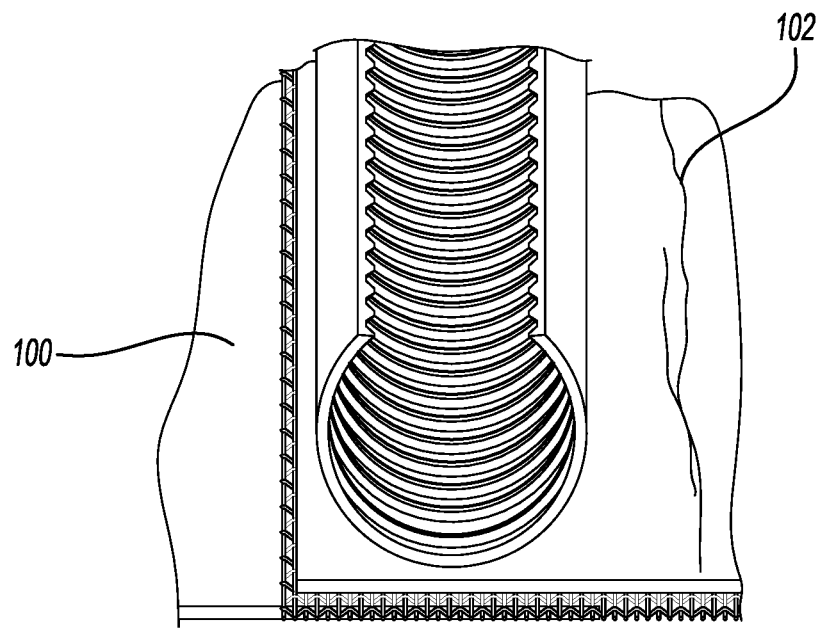
FIG. 16 is a photograph illustrating a joint of metal and polymer created in accordance with the principles of the present invention. A metal mesh was used as distributed air pockets to produce 3D "C—O-M" bond at the metal polymer interface.

In some embodiments, as illustrated in FIG. 15, the molten polymer flows into the porous structure 108 and react with the trapped air within porous structure 108, forming interim C=O groups. These C=O groups enables the formation of three-dimensionally distributed C—O-M chemical bonds 109 between the polymer and metal as vestigial trapped-air is expelled under localized welding pressure, resulting in three-dimensionally intermeshed joint interface (3D ChemBonds). This is evidenced by the produced polymer metal joins illustrated in FIG. 16.

Figure 17:
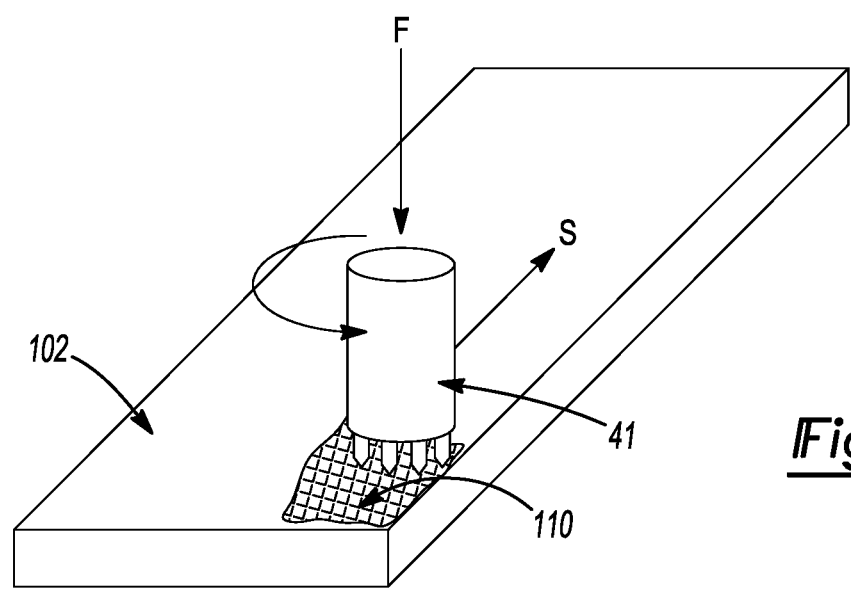
FIG. 17 is a schematic view of producing in-situ distributed air pocket (e.g. distributed 3D surface features) on the metal surface using a rotating tool with scribe tips.
Figure 18:
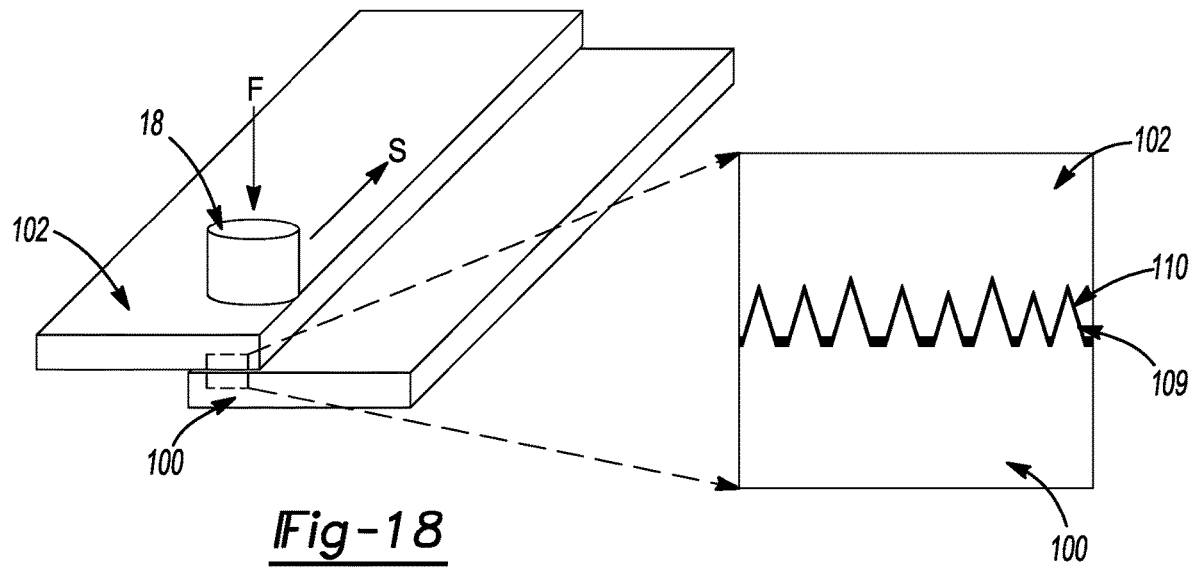
FIG. 18 is a schematic view of a joining of metal and polymer with 3D chemical bonds (109) in accordance with the principles of the present invention. In-situ distributed air pocket on metal surface produced in FIG. 17 is placed to against the polymer 100.

In some embodiments, as illustrated in FIG. 17, distributed 3D surface features 110 was produced by a rotating tool with one or multiple scribe tips 41. The distributed 3D surface features is then placed to against the polymer 100 prior to welding, as illustrated in FIG. 18. During welding, the molten polymer flows into the distributed 3D surface features 110 and react with the trapped air within distributed 3D surface features 110, forming interim C=O groups. These C=O groups enables the formation of three-dimensionally distributed C—O-M chemical bonds 109 between the polymer and metal as vestigial trapped-air is expelled under localized welding pressure, resulting in three-dimensionally intermeshed joint interface (3D ChemBonds).

Figure 19:
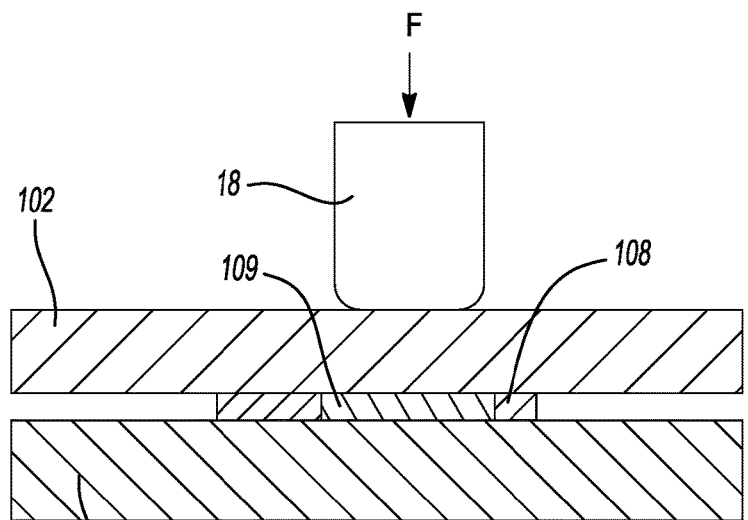
FIG. 19 is a side view of the joining system according to the principles of the present invention for producing 3D "C—O-M" chemical bonds at a spot joint configuration.

In some embodiments, as illustrated in FIG. 19, three-dimensionally distributed C—O-M chemical bonds 109 between the polymer 100 and metal 102 can be produced at the interface of a spot lap joint.

Figure 21:
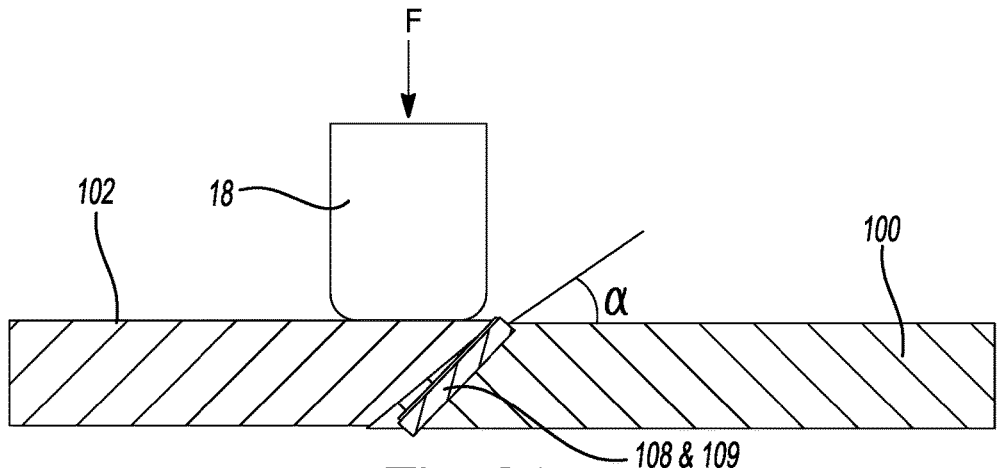
FIG. 21 is a side view of the joining system according to the principles of the present invention for producing 3D "C—O-M" chemical bonds at a butt joint configuration.

In some embodiments, as illustrated in FIG. 21, three-dimensionally distributed C—O-M chemical bonds 109 between the polymer 100 and metal 102 can be produced at the interface of a lap joint. In some embodiments, the angle α is in the range of 15-100 degree.

Figure 20:
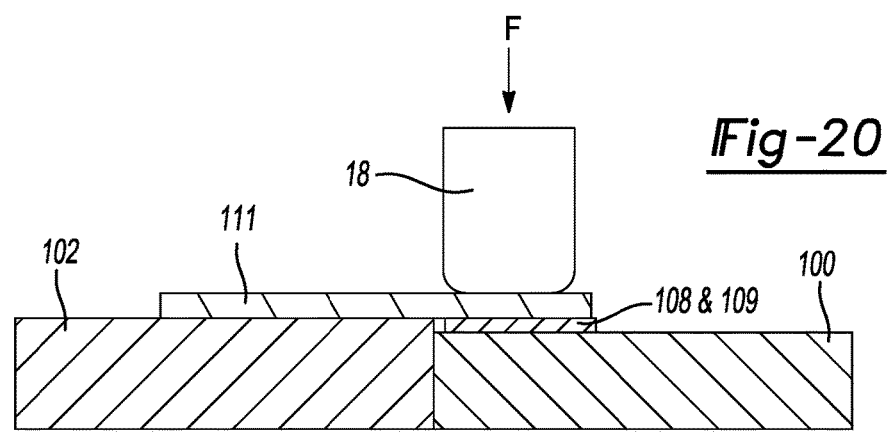
FIG. 20 is a side view of the joining system according to the principles of the present invention for producing 3D "C—O-M" chemical bonds at strap joint configuration.

In some embodiments, as illustrated in FIG. 20, strap joints of polymer 100 and metal 102 can be produced through a third metal layer 111. The bond between metal 102 and the metal layer 111 can be achieved by currently available joining solutions (such as resistance welding).

Accordingly, in some embodiments, a joining system is provided for directly joining a polymer to a metal along a joint interface through the formation of strong chemical bonds of C—O-M, where M represents an element in the metal to be joined. The system comprising a heating system configured to heat the metal to a predetermined temperature above the glass transition temperature of the polymer and less than a flash ignition temperature of the polymer and less than a metal melting temperature of the metal; and a forging pressure applicator configured to physically contact at least one of the metal and the polymer and apply compression pressure to the joint interface of the metal and the polymer when the metal is above the glass transition temperature of the polymer and less than the flash ignition temperature of the polymer and less than the metal melting temperature of the metal, the forging pressure applicator applying sufficient compression pressure upon the joint interface of the metal and the polymer to generate intimate atomic contact between the metal and the polymer to create the joint interface. The welding temperature reduced to below polymer melting temperature before 5% of the melted polymer has pyrolyzed.

In some embodiments, dirt and grease is removed from the metal surface for forming C—O-M chemical bonds at the joint interface. In some embodiments, the joint interface comprises distributed air pockets between the metal and the polymer for forming three-dimensional distributed C—O-M chemical bonds at the joint interface.

In some embodiments, the forging pressure applicator is configured to physically contact at least one of the metal and the polymer, capture a porous structure there between, and apply compression pressure to the joint interface of the metal, the porous structure, and the polymer.

In some embodiments, the joining system comprises an air pocket forming system configured to form 3D surface features, grooves, or protrusions on a surface of the metal. In some embodiments, these features are produced by mechanical engraving, electron beam, chemical agent, and/or electrical discharge system.

In some embodiments, the forging pressure applicator is separate from and spaced apart from the heating system. In some embodiments, the forging pressure applicator is integrally formed with the heating system as a unitary member, the unitary member configured to heat the metal and apply the compression pressure.

In some embodiments, at least one of the heating system and the forging pressure applicator is configured to be moved relative to the metal and the polymer to create a linear joint interface.

In some embodiments, at least one of the heating system and the forging pressure applicator is configured to be moved relative to the metal and the polymer to create a curvilinear joint interface.

In some embodiments, the forging pressure applicator is configured to be stationary relative to the metal and the polymer to create the joint interface. In some embodiments, the forging pressure applicator comprises at least two forging pressure applicators. In some embodiments, a first of the at least two forging pressure applicators is configured to be moved relative to the metal and the polymer and a second of the at least two forging pressure applicators is configured to be stationary relative to the metal and the polymer. In some embodiments, the at least two forging pressure applicators are configured to be moved relative to the metal and the polymer. In some embodiments, the at least two forging pressure applicators are configured to be stationary relative to the metal and the polymer.

In some embodiments, the forging pressure applicator is configured to apply compression pressure to the metal and the polymer perpendicularly to the joint interface. In some embodiments, the forging pressure applicator is configured to apply compression pressure to the metal and the polymer at an inclined angle relative to the joint interface. In some embodiments, the forging pressure applicator comprises a body portion terminating at a distal end having a pressure application surface configured to physically contact the metal. In some embodiments, the body portion is elongated and the pressure application surface is flat. In some embodiments, the body portion is elongated and the pressure application surface is curved.

In some embodiments, the heating system is selected from the group consisting of a thermal heating system, an induction heating system, a friction system, a high-rate plastic deformation system, an electric resistance system, and a high-energy beam system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of directly joining a polymer to a metal along a joint interface through the formation of C—O-M chemical bonds, the method comprising:
heating the metal to a predetermined temperature above a glass transition temperature of the polymer and less than a flash ignition temperature of the polymer and less than a metal melting temperature of the metal;
applying force to the joint interface of the metal and the polymer via a tool thereby generating intimate atomic contact between the metal and the polymer to form the joint interface comprising substantially C—O-M chemical bonds between the metal and the polymer; and
reducing the temperature of the metal below the polymer melting temperature before 5% of the polymer has pyrolyzed.

2. The method according to claim 1 further comprising forming distributed air pockets between the metal and the polymer for forming three-dimensional distributed C—O-M chemical bonds at the joint interface.

3. The method according to claim 2 wherein the step of forming distributed air pockets comprises forming distributed air pockets by forming three-dimensional surface features, grooves, or protrusions on the surface of the metal prior to the step of applying force.

4. The method according to claim 3 further comprising forming the three-dimensional surface features, grooves, or protrusions using at least one of a mechanical engraving system, an electron beam, a chemical agent, and an electrical discharge system.

5. The method according to claim 2 wherein the step of forming distributed air pockets comprises capturing a porous structure between the metal and the polymer prior to and during the step of applying force to the joint interface of the metal and the polymer when the temperature of the metal is above the glass transition temperature of the polymer and less than the flash ignition temperature of the polymer and less than the metal melting temperature of the metal.

6. The method according to claim 1 wherein the step of applying force to the joint interface comprises applying interfacial force to the joint interface.

7. The method according to claim 1 further comprising removing dirt and grease from the surface of the metal prior to the step of applying force forming the C—O-M chemical bonds at the joint interface.

8. The method according to claim 1 wherein the step of heating and the step of applying force are achieved using a unitary system.

9. The method according to claim 1 wherein the step of heating and the step of applying force are achieved using discrete systems.

10. The method according to claim 1 wherein the step of applying force to the joint interface of the metal and the polymer comprises applying force perpendicularly to the joint interface of the metal and the polymer.

11. The method according to claim 1 wherein the applying force to the joint interface of the metal and the polymer comprises applying force at an inclined angle relative to the joint interface of the metal and the polymer.

12. The method according to claim 1 wherein the step of heating the metal comprises heating the metal by thermal heating, induction heating, frictional heating, a high-rate plastic deformation heating, electric resistance heating, or high-energy beam heating.

13. The method according to claim 1 wherein the step of applying force is completed in sequence after the step of heating the metal to the predetermined temperature.

* * * * *